(12) United States Patent
Belenkiy et al.

(10) Patent No.: US 9,256,030 B2
(45) Date of Patent: Feb. 9, 2016

(54) OPTICAL FIBER CABLE ASSEMBLY WITH IMPROVED STRAIN RELIEF

(71) Applicants: Yuriy Belenkiy, Wheeling, IL (US); B. Daniel Szilagyi, Naperville, IL (US)

(72) Inventors: Yuriy Belenkiy, Wheeling, IL (US); B. Daniel Szilagyi, Naperville, IL (US)

(73) Assignee: Molex, LLC, Lisle, IL (US)

( * ) Notice: Subject to any disclaimer, the term of this patent is extended or adjusted under 35 U.S.C. 154(b) by 371 days.

(21) Appl. No.: 13/730,961

(22) Filed: Dec. 29, 2012

(65) Prior Publication Data

US 2013/0209042 A1    Aug. 15, 2013

Related U.S. Application Data

(60) Provisional application No. 61/582,296, filed on Dec. 31, 2011.

(51) Int. Cl.
*G02B 6/36* (2006.01)
*G02B 6/38* (2006.01)

(52) U.S. Cl.
CPC .............. *G02B 6/36* (2013.01); *G02B 6/3885* (2013.01); *G02B 6/3887* (2013.01)

(58) Field of Classification Search
CPC .................................................... G02B 6/3887
See application file for complete search history.

(56) References Cited

U.S. PATENT DOCUMENTS

| | | | |
|---|---|---|---|
| 5,923,802 A * | 7/1999 | Giebel et al. | 385/76 |
| 6,206,579 B1 | 3/2001 | Selfridge et al. | |
| 6,264,374 B1 | 7/2001 | Selfridge et al. | |
| 2003/0094767 A1 * | 5/2003 | Storaasli et al. | 277/602 |
| 2004/0126069 A1 | 7/2004 | Jong et al. | |

FOREIGN PATENT DOCUMENTS

CN    2667510 Y    12/2004

* cited by examiner

*Primary Examiner* — Uyen Chau N Le
*Assistant Examiner* — Chad Smith
(74) *Attorney, Agent, or Firm* — Jeffrey K. Jacobs (57) ABSTRACT

An optical fiber cable assembly includes an optical fiber cable, an optical fiber connector and a strain relief member. The optical fiber connector has a housing supporting a plurality of optical fibers of the cable. The strain relief member has a flexible conduit, a first section and a second section spaced from the first section. The first section is connected to a rear end of the optical fiber connector and the second section is connected to a portion of the optical fiber cable.

15 Claims, 7 Drawing Sheets

OPTICAL FIBER CABLE ASSEMBLY WITH IMPROVED STRAIN RELIEF

REFERENCE TO RELATED APPLICATIONS

The Present Disclosure claims priority to prior-filed U.S. Provisional Patent Application No. 61/582,296, entitled "Optical Fiber Cable Assembly With Improved Strain Relief," filed on 31 Dec. 2011 with the United States Patent And Trademark Office. The content of the aforementioned Patent Application is incorporated in its entirety herein.

BACKGROUND OF THE PRESENT DISCLOSURE

The Present Disclosure relates generally to optical fiber cable assemblies and, more particularly, to a multi-fiber optical fiber cable assembly with an improved strain relief assembly.

When manufacturing optical fiber cable assemblies, is often desirable to arrange a plurality of optical fibers in one or more generally parallel rows or side-by-side arrays. Such arrays are terminated to one or more ferrules and then mounted in an optical fiber connector. In one example, the optical fibers within an optical fiber cable are pre-formed as a plurality of arrays or ribbons that extend the length of the optical fiber cable. Such ribbonized cables may be less desirable in some applications as they are typically larger and less flexible than cables having a plurality of loosely bundled optical fibers.

Cables having loosely bundled optical fibers require that the optical fibers be arranged and secured together to form the desired number of arrays of optical fibers. The process of creating the arrays as well as mounting the arrays within one or more ferrules and subsequently polishing the ends of the optical fibers requires that a length of the protective jacket that surrounds the optical fibers be removed. Accordingly, a structure for protecting the optical fibers is desirable.

SUMMARY OF THE PRESENT DISCLOSURE

In one aspect, an optical fiber cable assembly includes an optical fiber cable, an optical fiber connector and a strain relief member. The optical fiber connector has a housing supporting a plurality of optical fibers of the cable. The strain relief member has a flexible conduit, a first section and a second section spaced from the first section. The first section of the strain relief member is connected to a rear end of the optical fiber connector and the second section of the strain relief member is connected to a portion of the optical fiber cable.

In another aspect, the cable may include a strength member extending along a length of the optical fiber cable and the second section of the strain relief member is mechanically coupled to a section of the strength member.

In another aspect, an optical fiber cable assembly includes an optical fiber connector. The optical fiber connector has a mating end, a rear end and a ferrule. An optical fiber cable has a plurality of optical fibers and a jacket surrounding the optical fibers. The plurality of optical fibers are supported by the ferrule. A strain relief assembly has a flexible conduit with a first section and a second section spaced from the first section. A first mounting adapter is connected to the optical fiber connector and a second mounting adapter is connected to the jacket of the optical fiber cable. The first section of the flexible conduit is connected to the first mounting adapter and the second section of the flexible conduit is connected to the second mounting adapter.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
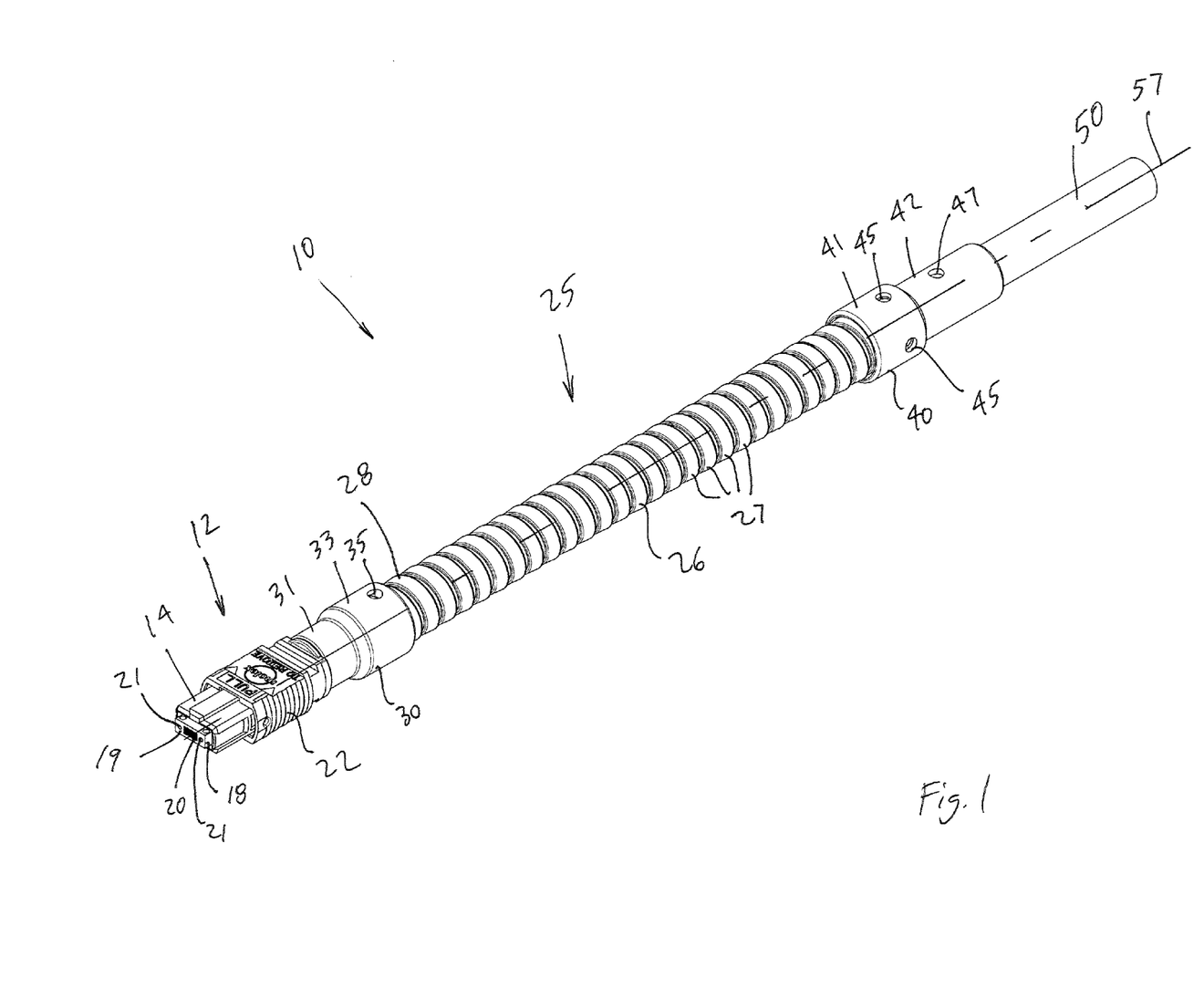
FIG. 1 is a perspective view of an embodiment of an optical fiber cable assembly according to the Present Disclosure.
Figure 2:
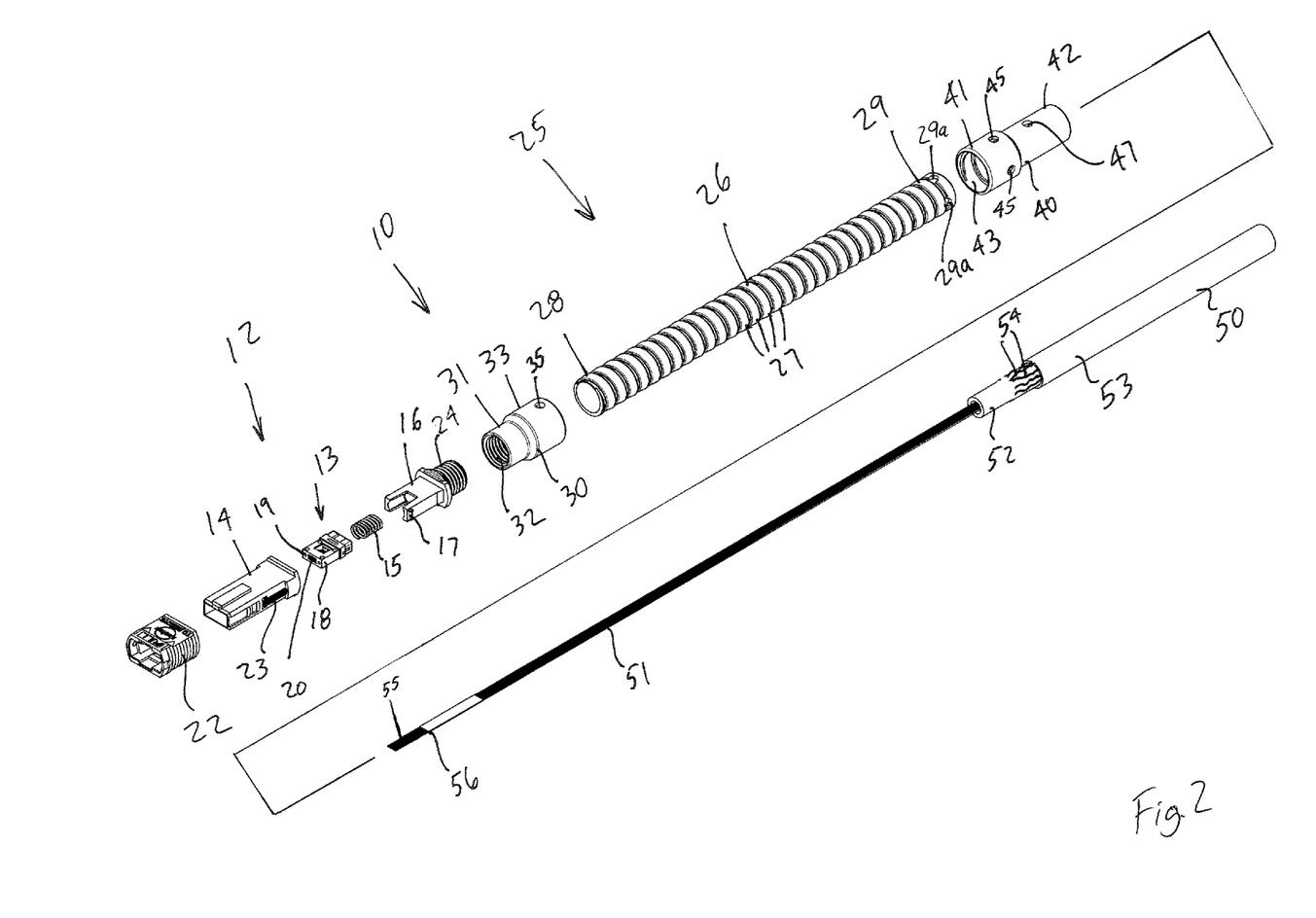
FIG. 2 is an exploded perspective view of the optical fiber cable assembly of FIG. 1.

Referring to FIGS. 1-2, an optical fiber cable assembly 10 is illustrated. Cable assembly 10 includes a connector assembly 12 which supports a multi-fiber ferrule assembly 13. Ferrule assembly 13 is terminated to a multi-fiber cable 50 having a plurality of optical fibers 51. Cable 50 has a plurality of individual loosely bundled optical fibers 51 within an inner flexible generally cylindrical jacket or sheath 52 that is surrounded by an outer flexible generally cylindrical jacket or sheath 53. A strength member 54 such as a plurality of strands of Kevlar® extend along the length of cable 50 between the inner jacket 52 and the outer jacket 53. As depicted, the individual optical fibers 51 and the inner jacket 52 are dimensioned so that the optical fibers may move to some extent within the inner jacket. During the process of manufacturing cable assembly 10, a termination end 55 of the optical fibers 51 may be secured together in one or more generally planar arrays 56 and inserted into ferrule assembly 13. In an alternate embodiment, the cable 50 may have one or more pre-formed ribbon assemblies (not shown) of optical fibers that extend within the inner jacket 52.

Although depicted as an MPO (multi-fiber push-on) connector, connector assembly 12 may be any type of multi-fiber optical connector. Connector assembly 12 has a plurality of components generally aligned along longitudinal axis 57 of cable 50. More specifically, outer housing component 14 has a central opening therein and into which ferrule assembly 13 is inserted. A biasing member such as a spring 15 is positioned axially behind the ferrule assembly 13 within outer housing component 14 and along the longitudinal axis 57. Inner housing component 16 is secured to the outer housing component 14 to position and resiliently bias ferrule assembly 13 within the outer housing component 14. As depicted, inner housing component 16 has a pair of latch projections 17 that engage ledges (not shown) within the outer housing component 14 to secure the inner housing component 16 within the outer housing component 14. Inner housing component 16 has a central opening therein through which the optical fibers 51 pass. Outer housing component 14 and inner housing component 16 may be formed of any suitable material. In some embodiments, the housing components may be formed of a resin capable of being molded.

The ferrule assembly 13 includes a generally rectangular ferrule 18 with a generally flat front face 19. Ferrule 18 may include one or more rows of generally cylindrical optical fiber receiving holes or bores 20 that extend through the ferrule 18 to the front face 19. Ferrule 18 may include a pair of alignment holes or receptacles 21 positioned on opposite sides of the array of fiber receiving holes 20. Ferrule 18 may be formed of a resin capable of being injection molded such as PPS or Ultem® and may include an additive such as silica (SiO2) to increase or improve the dimensional characteristics, strength and stability of the resin. One of the optical fibers 51 of multi-fiber cable 50 is positioned within each fiber receiving hole 20. The front face 19 of the ferrule 18 and the end faces of the optical fibers 51 adjacent the front face 19 are polished to a desired finish. In some embodiments, connector assembly 12 may be configured to have more than one ferrule assembly 13 positioned therein.

A slidable latching collar 22 may be mounted on the outer housing component 14 to facilitate latching of the cable assembly 10 to a mating component such as an optical fiber adapter (not shown). A biasing member such as a pair of springs 23 (only one of which is shown in FIG. 2) is positioned between the outer housing component 14 and the slidable latching collar 22 to bias the slidable latching collar in a forward or mating direction.

Cable assembly 10 includes a strain relief assembly 25 for protecting the optical fibers 51 of cable 50. More specifically, strain relief assembly 25 includes a flexible conduit 26, a forward mounting collar or extender 30 and a rear mounting collar or extender 40. Flexible conduit 26 may be a flexible corrugated conduit that includes a helically wound structure or tube with overlapping convolutions 27 that interlock with one another. The flexible conduit may be formed of metal or other materials. Other flexible conduit structures may also be used.

Forward mounting collar 30 acts as an adapter to secure a forward portion 28 of the flexible conduit 26 to the connector assembly 12. Forward mounting collar 30 has a generally cylindrical shape with a forward section 31 for securing to the inner housing component 16 of connector assembly 12. Forward section 31 may have a threaded inner diameter 32 configured to be screwed onto external threads at the rear section 24 of inner housing component 16. A rear section 33 of forward mounting collar 30 is configured to secure the flexible conduit 26 to the forward mounting collar. Rear section 33 of forward mounting collar 30 may include a threaded inner diameter 34 (FIG. 3) configured to threadingly receive a forward portion 28 of flexible conduit 26 therein. One or more apertures 35 may be provided in the rear section 33 of forward mounting collar 30 to provide a passage for an adhesive 60 (FIG. 3) such as epoxy to secure the flexible conduit 26 to the forward mounting collar 30. In an alternate embodiment (not shown), the forward mounting collar may be configured as a portion or member of the connector assembly 12. As an example, the rear inner housing component 16 may be modified so that the rear section 24 directly engages the forward portion 28 of flexible conduit 26.

Rear mounting collar 40 acts as an adapter to secure a rear portion 29 of the flexible conduit 26 to the cable 50. Rear mounting collar 40 has a forward section 41 and a rear section 42. Forward section 41 has a threaded inner diameter 43 and is dimensioned to threadingly receive the rear portion 29 of flexible conduit 26 therein. The rear section 42 has an inner diameter 44 dimensioned to receive outer jacket 53 of optical fiber cable 50 therethrough. The forward section 41 may include one or more apertures 45 to permit the passage of an adhesive 61 (FIG. 3) such as epoxy through the apertures 45 and into contact with the rear portion 29 of flexible conduit 26 to secure the flexible conduit and the rear mounting collar 40 together. The rear portion 29 of flexible conduit 26 may include apertures 29a to permit the passage of the adhesive 61 through apertures 29a and into contact with a portion of optical fiber cable 50 such as strength member 54. The rear section 42 of rear mounting collar 40 may include one or more apertures 47 to permit the passage of an adhesive 62 (FIG. 3) such as epoxy through the apertures and into contact with the outer jacket 53 of cable 50 to secure the rear mounting collar 40 and the outer jacket together.

Figure 4:
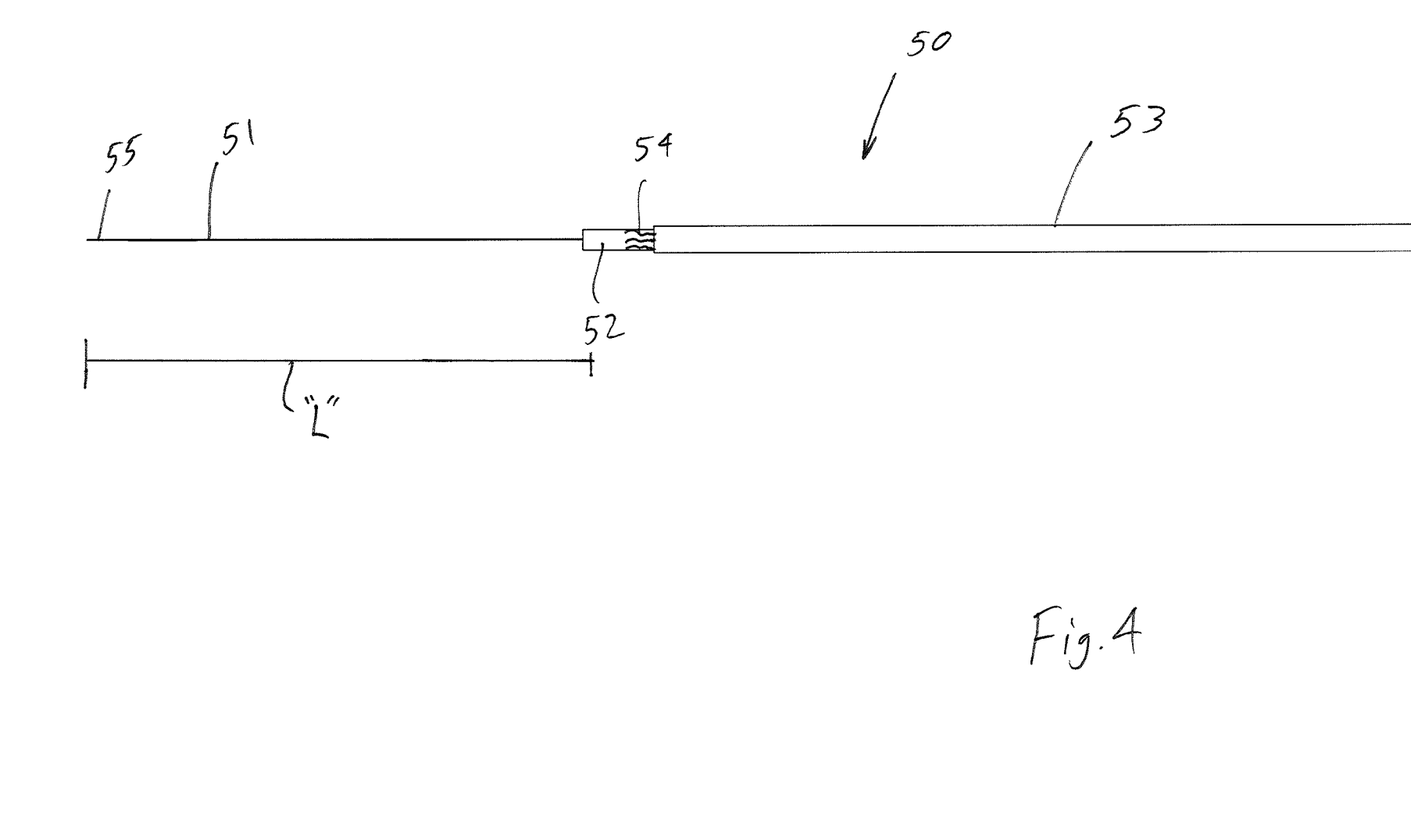
FIG. 4 is a side view of the optical fiber cable that forms a part of the optical fiber cable assembly of FIG. 1.
Figure 5:
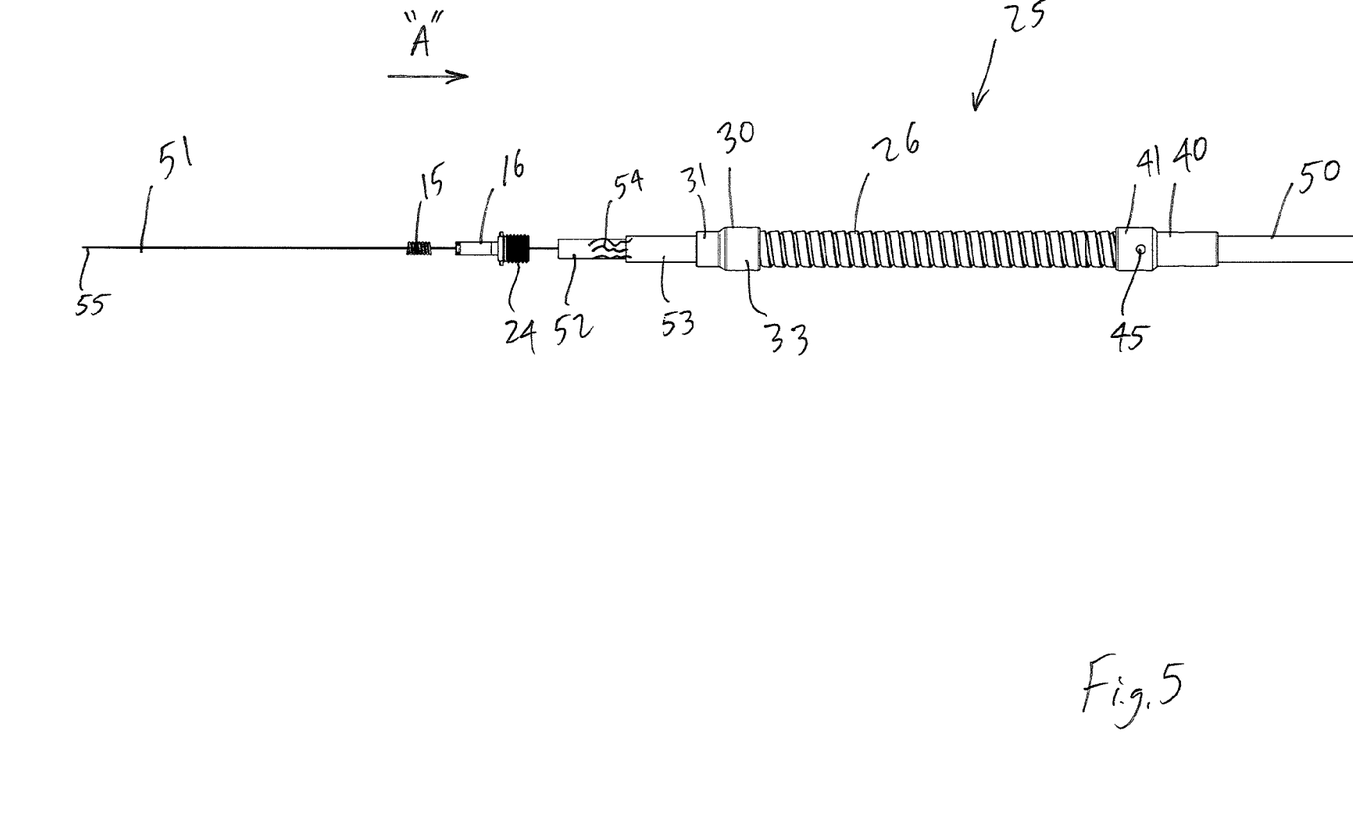
FIG. 5 is a side view of the optical fiber cable of FIG. 4 with certain components slid thereon as an initial step of manufacturing the optical fiber cable assembly of FIG. 1.

Referring to FIGS. 4-7, the process for assembling the optical fiber cable assembly 10 is depicted. Referring to FIG. 4, the optical fiber cable 50 is prepared by removing a length of the inner jacket 52 and the outer jacket 53 so as to expose a length "L" of optical fibers 51 and a relatively short length of inner jacket 52 with a predetermined length of the strength member 54 exposed on top of the inner jacket. Depending upon the type of connector to which the optical fibers 51 are to be terminated, the optical fibers may be "ribbonized" or laid side-by-side in one or more arrays and secured together. As depicted in FIG. 5, rear housing collar 40 is first slid onto the prepared cable 50 in the direction "A" and then is followed by the flexible conduit 26 and the forward mounting collar 30. The inner housing component 16 is then slid onto the optical fibers 51 and is followed by the spring 15.

Figure 6:
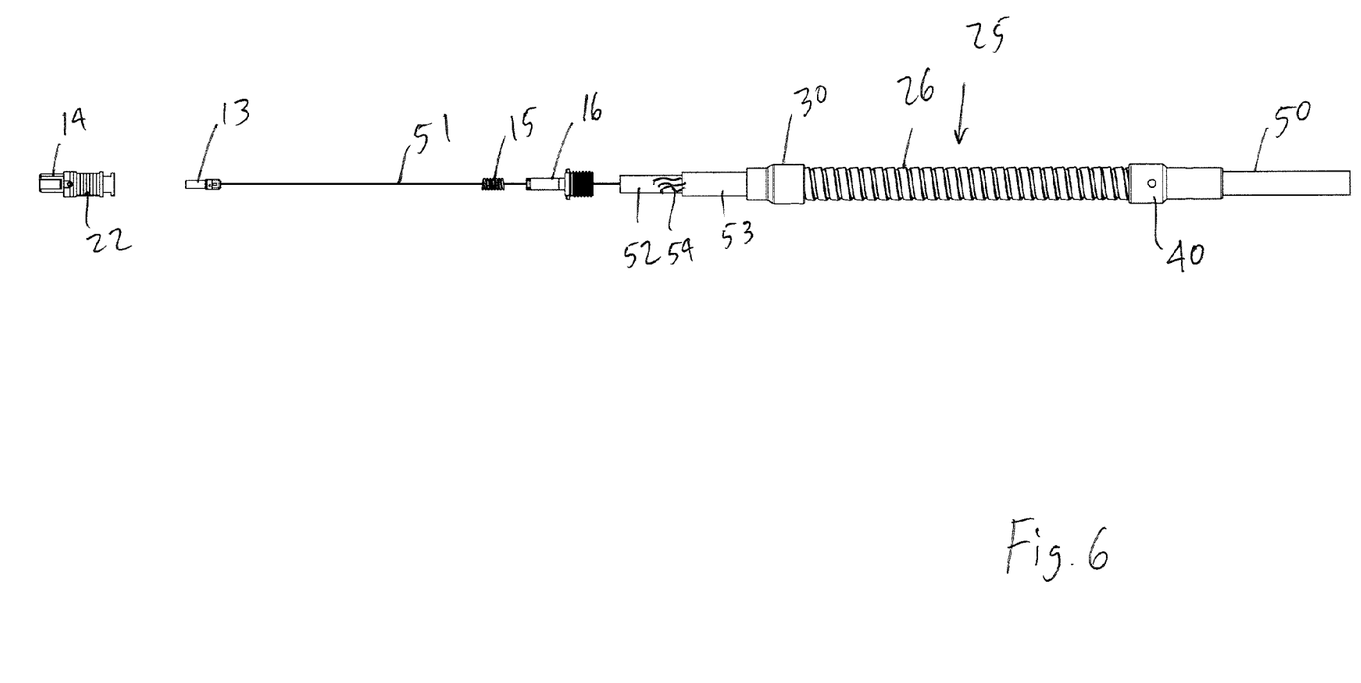
FIG. 6 is a side view of the optical fiber cable and components of FIG. 4 with a ferrule assembly terminated to the optical fiber cable.

Referring to FIG. 6, the termination ends 55 of the optical fibers 51 are inserted into ferrule assembly 13 and terminated thereto in a known manner. The end faces of the optical fibers 51 adjacent the front face 19 of the ferrule 18 are polished to a desired finish. It should be noted that the length "L" of the optical fibers 51 may be established based upon the length required to prepare, terminate and polish the optical fibers. In general, the greater number of optical fibers as well as the greater number arrays of optical fibers to be inserted into the ferrule assembly 13, the greater the required length of "L."

Figure 7:
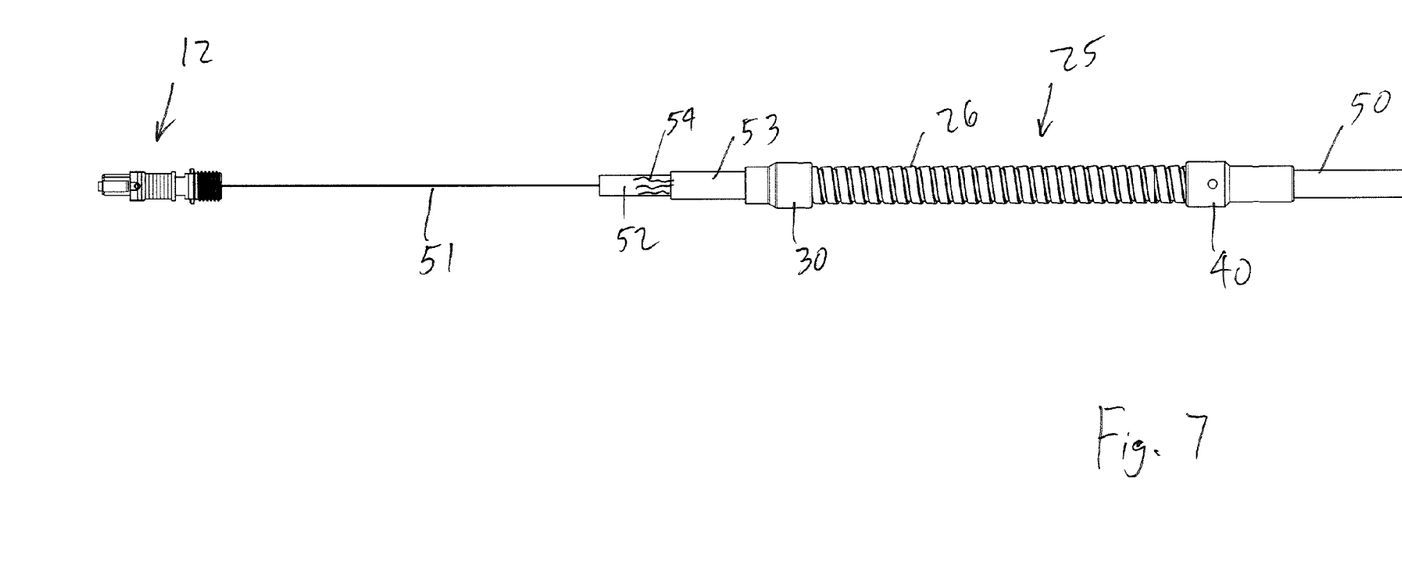
FIG. 7 is a side view of the optical fiber cable and components of FIG. 4 with an optical fiber connector at an end thereof.

Referring to FIG. 7, the terminated ferrule assembly 13 is inserted into the outer housing component 14 and the spring 15 and the inner housing component 16 are slid forward towards the outer housing component 14. The latch projections 17 of the inner housing component 16 lockingly engage with the outer housing component 14 to capture the ferrule assembly 13 between the outer housing component 14 and the inner housing component 16 to complete the assembly of connector assembly 12. The spring 15 acts as a biasing member to bias the ferrule assembly 13 forward towards the tip of optical fiber cable assembly 10.

Forward mounting collar 30 is then slid towards connector assembly 12 (opposite direction "A") and threaded onto the threaded rear section 23 of inner housing component 16. If desired, an adhesive 63 (FIG. 3) such as epoxy may be applied to the threads of the inner housing component 16 and the forward mounting collar 30 to prevent disassembly of the cable assembly 10. Flexible conduit 26 is then slid along cable 50 towards connector assembly 12 and is rotated so as to threadingly engage the threads of the inner diameter 33 of the rear section 32 of forward mounting collar 30. An adhesive 60 such as epoxy may be applied through apertures 35 in the rear section 32 of forward mounting collar 30 either as the flexible conduit 26 is being threaded into the forward mounting collar or after the flexible conduit has been fully inserted therein.

Figure 3:
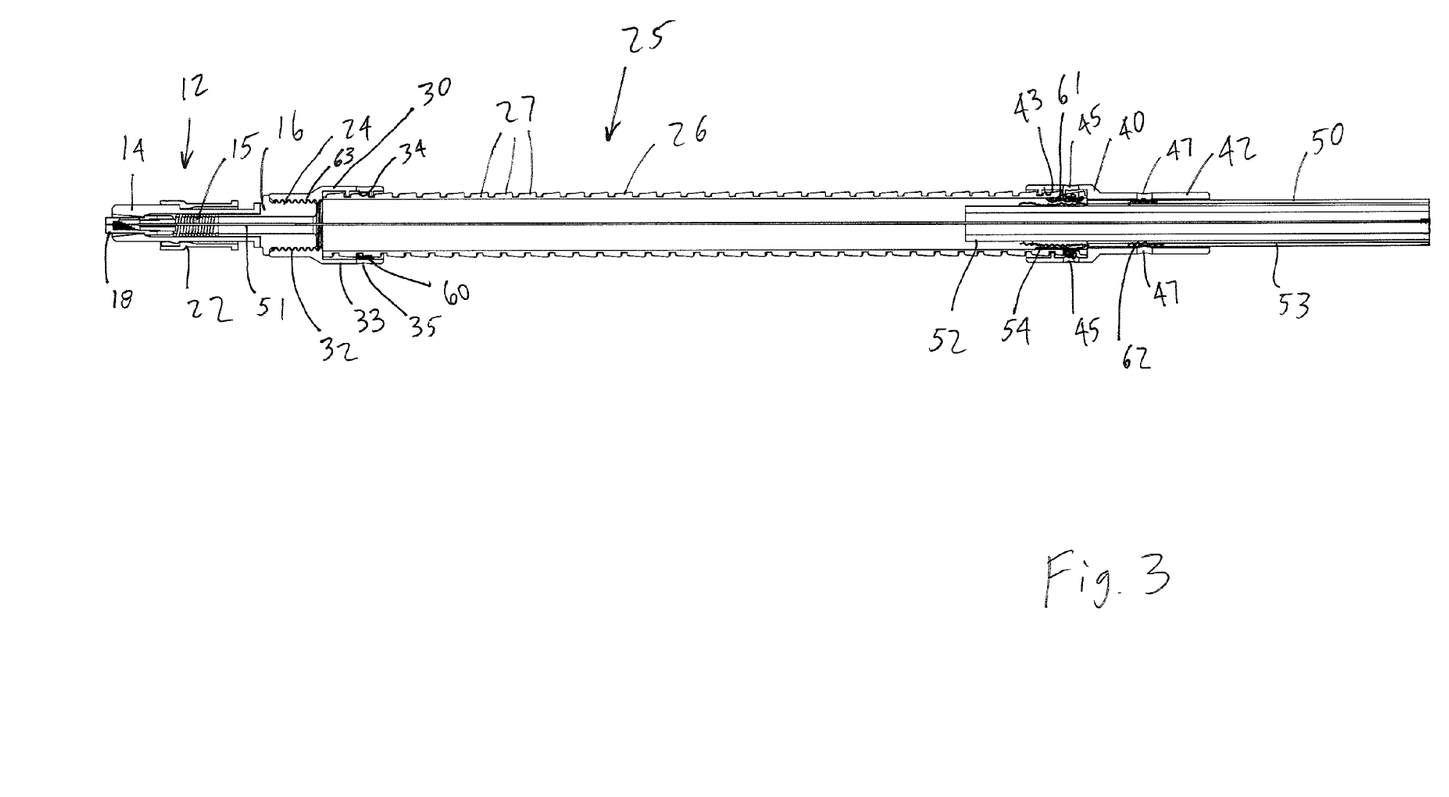
FIG. 3 is a section taken generally along Line 3-3 of FIG. 1.

The rear mounting collar 40 is slid along the outer jacket 53 of cable 50 towards the connector assembly 12 and rotated onto the flexible conduit 26 so that the rear portion 29 of the flexible conduit 26 threadingly engages the threads along the inner diameter 43 of the forward section 41 of the rear mounting collar 40. An adhesive 61 (FIG. 3) such as epoxy may be inserted through apertures 45 and into engagement with the rear portion 29 of the flexible conduit 26 and also pass through the apertures 29a in the rear portion so as to engage the strength members 54 that are positioned on the inner jacket 52 as best seen in FIG. 3. In addition, an adhesive 62 such as epoxy may also be inserted through apertures 47 in the rear section 42 of the rear mounting collar 40 so as to secure the rear section of the mounting collar to the outer jacket 53 of cable 50. The adhesives 61, 62 may be inserted into the apertures 45 in the forward section 41 of the rear mounting collar 40 as well as the apertures 47 in the rear section 42 during the process of securing the rear mounting collar 40 to the flexible conduit 26 or once the rear mounting collar 40 is secured in place.

It should be noted that it may be desirable for the inner jacket 52 of cable 50 to extend a sufficient distance towards connector assembly 12 past rear mounting collar 40 so that the adhesive 61 that passes through flexible conduit 26 and into engagement with the strength members 54 does not flow past the inner jacket and into contact with the optical fibers 51. If the adhesive 61 engages the optical fibers 51 within the flexible conduit 26, movement of the optical fibers may be impaired and negatively affect the performance and durability of the cable assembly 10.

Although the forward mounting collar 30 is depicted as being threaded onto the inner housing component 16, the flexible conduit 26 is configured to threadingly engage the forward mounting collar 30 and the rear mounting collar 40, and the rear mounting collar 40 is configured to be secured to the outer jacket 53 of cable 50 with an adhesive 62 that passes through apertures 47, these connections may be made in other manners. For example, it may be possible to snap or crimp the forward mounting collar 30 to the inner housing component 16 or eliminate the forward mounting collar 30 altogether. Similarly, it may be possible to snap or crimp the forward mounting collar 30 and the rear mounting collar 40 to the flexible conduit 26 and/or the outer jacket 53.

In many embodiments, flexible conduit 26 is sufficiently long so as to cover the exposed length or portion "L" of optical fibers that are not protected by the inner jacket 52, outer jacket 53 and strength members 54 of cable 50. In addition, the convolutions 27 of flexible conduit 26 may be configured so as to limit the bending of flexible conduit 26 to a predetermined radius that will protect the optical fibers 51.

While the embodiment of FIGS. 1-7 depicts a structure in which the spring 15, the rear housing component 16, the flexible conduit 26, the forward mounting collar 30 and the rear mounting collar 40 are all slid onto the cable 50 before the ferrule assembly 13 is terminated to the optical fibers 51, the components of the cable assembly 10 may be configured and dimensioned so that many, if not all, of the components could be slid onto the cable after termination of the optical fibers to the ferrule assembly.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

While a preferred embodiment of the Present Disclosure is shown and described, it is envisioned that those skilled in the art may devise various modifications without departing from the spirit and scope of the foregoing Description and the appended Claims.

What is claimed is:

1. An optical fiber cable assembly comprising:
   an optical fiber cable, the optical fiber cable having a plurality of optical fibers, a jacket surrounding the optical fibers, and a strength member extending along a length of the optical fiber cable;
   an optical fiber connector, the optical fiber connector having a housing supporting the plurality of optical fibers therein; and
   a strain relief member having a flexible corrugated conduit, the flexible corrugated conduit including a first section and a second section spaced from the first section, the strain relief member further including a first mounting adapter and a second mounting adapter, each of the first mounting adapter and the second mounting adapter having an internally threaded receptacle, the first section being threadingly connected to the internally threaded receptacle of the first mounting adapter and the first mounting adapter being connected to a rear end of the optical fiber connector and the second section being mechanically coupled to a section of the strength member of the optical fiber cable and threadingly connected to the internally threaded receptacle of the second mounting adapter.

2. The optical fiber cable assembly of claim 1, wherein the first mounting adapter has a threaded section for threadingly engaging a threaded section of the optical fiber connector.

3. The optical fiber cable assembly of claim 1, wherein the first mounting adapter and the second mounting adapter each include at least one opening aligned with its respective internally threaded receptacle through which an adhesive passes.

4. The optical fiber cable assembly of claim 1, wherein the first mounting adapter and the second mounting adapter are both generally cylindrical.

5. The optical fiber cable assembly of claim 1, further including a ferrule, the ferrule has a front face, and an end of each optical fiber is positioned generally adjacent the front face of the ferrule.

6. The optical fiber cable assembly of claim 1, wherein the section of the strength member is mechanically coupled to the flexible corrugated conduit through an adhesive.

7. The optical fiber cable assembly of claim 1, wherein the plurality of optical fibers are loosely positioned within the jacket and are arranged in at least one generally planar side-by-side array within the optical fiber connector.

8. An optical fiber cable assembly comprising:
   an optical fiber connector, the optical fiber connector having a mating end, a rear end and a ferrule;
   an optical fiber cable, the optical fiber cable having a plurality of optical fibers and a jacket surrounding the optical fibers, the plurality of optical fibers being supported by the ferrule; and
   a strain relief assembly having a flexible corrugated conduit with a first section and a second section spaced from the first section, a first mounting adapter having a first end connected to the optical fiber connector and a second end including a first internally threaded receptacle threadingly connected to the first section, and a second mounting adapter having a first end including a second internally threaded receptacle threadingly connected to the second section and a second end connected to the jacket of the optical fiber cable, the first mounting adapter having at least one opening aligned with the first internally threaded receptacle with an adhesive passing therethrough and engaging the first section, and the second mounting adapter having at least one opening aligned with the second internally threaded receptacle with an adhesive passing therethrough and engaging the second section.

9. The optical fiber cable assembly of claim 8, wherein the first mounting adapter has a threaded section for threadingly engaging a threaded section of the optical fiber connector.

10. The optical fiber cable assembly of claim 8, wherein the first mounting adapter and the second mounting adapter are both generally cylindrical.

11. The optical fiber cable assembly of claim 8, wherein the ferrule has a front face, and an end of each optical fiber is positioned generally adjacent the front face of the ferrule.

12. The optical fiber cable assembly of claim 8, wherein the optical fiber cable includes a strength member extending along a length thereof, a section of the strength member being mechanically coupled to the flexible conduit.

13. The optical fiber cable assembly of claim 12, wherein the section of the strength member is mechanically coupled to the second section of the flexible conduit.

14. The optical fiber cable assembly of claim 12, wherein the section of the strength member is mechanically coupled to the flexible corrugated conduit through an adhesive.

15. The optical fiber cable assembly of claim 8, wherein the plurality of optical fibers are loosely positioned within the jacket and are arranged in at least one generally planar side-by-side array within the optical fiber connector.

* * * * *